United States Patent
Tischenko et al.

(10) Patent No.: US 7,835,487 B2
(45) Date of Patent: Nov. 16, 2010

(54) IMAGING APPARATUS AND IMAGING METHOD

(75) Inventors: Oleg Tischenko, München (DE); Christoph Hoeschen, Hebertshausen (DE)

(73) Assignee: Helmholtz Zentrum Mü Deutsches Forscshungszentrum fur Gesundheit and Umwelt (GmbH) (DE)

( * ) Notice: Subject to any disclaimer, the term of this patent is extended or adjusted under 35 U.S.C. 154(b) by 0 days.

(21) Appl. No.: 12/306,347

(22) PCT Filed: Jul. 4, 2007

(86) PCT No.: PCT/EP2007/005919

§ 371 (c)(1), (2), (4) Date: Apr. 8, 2009

(87) PCT Pub. No.: WO2008/003476

PCT Pub. Date: Jan. 10, 2008

(65) Prior Publication Data

US 2009/0310738 A1    Dec. 17, 2009

(30) Foreign Application Priority Data

Jul. 4, 2006   (EP) .................. 06013850

(51) Int. Cl.
G21K 1/12 (2006.01)
G21K 1/04 (2006.01)
(52) U.S. Cl. ............................ 378/10; 378/19; 378/160
(58) Field of Classification Search ................. 378/4, 378/10, 19, 20, 145–155, 160
See application file for complete search history.

(56) References Cited

U.S. PATENT DOCUMENTS 4,190,773 A    2/1980    Braden et al.
7,310,404 B2 *   12/2007    Tashiro et al. .................. 378/10

FOREIGN PATENT DOCUMENTS

EP    0223432 A2    5/1987
SU    881590 A1    11/1981
WO    WO 01/23910 A2    4/2001

* cited by examiner

*Primary Examiner*—Irakli Kiknadze
(74) *Attorney, Agent, or Firm*—DLA Piper LLP (US)

(57) ABSTRACT

Imaging apparatus, for analyzing an object, comprising: a radiation source for transmission of radiation through said object in a section plane of said object; a radiation detector for detecting said radiation in said section plane of said object after transmission through said object; and a masking device for masking out a part of said radiation, wherein said masked part of said radiation is movable in said section plane relative to said radiation detector during said analysis of said object.

37 Claims, 8 Drawing Sheets

IMAGING APPARATUS AND IMAGING METHOD

RELATED APPLICATION

This is a §371 of International Application No. PCT/EP2007/005919, with an international filing date of Jul. 4, 2007 (WO 2008/003476 A2, published Jan. 10, 2008), which is based on European Patent Application No. 06013850.0 filed Jul. 4, 2006.

TECHNICAL FIELD

The invention relates to an imaging apparatus, particularly to a tomography apparatus, and to a corresponding imaging method.

BACKGROUND

Tomography apparatuses are well known and widely used in the fields of medical science and materials research as a diagnostic tool for generating sectional views of an object, e.g. the human body. The conventional tomography apparatuses comprise a radiation source, e.g. an X-ray source, rotating relative to the object and transmitting radiation through the object at different angles. Further, a radiation detector is disposed on the other side of the object for detecting the radiation after transmission through the object. In conventional tomography apparatuses the radiation detector comprises a large number of picture elements in order to achieve a high optical resolution. In this way, so-called Radon data are generated, which are representing properties (e.g. the attenuation of the radiation) of the object and which are further processed for generating a cross sectional view of the object. The general principles of computer tomography are explained in, for example, BUZUG: "Einführung in die Computertomographie", Springer-Verlag (2004).

One problem of the aforementioned conventional tomography apparatuses is that the optical resolution is restricted by the number and size of the picture elements of the radiation detector. On the one hand, a large number and a small size of the picture elements are desirable in order to obtain a high optical resolution of the tomography apparatus. On the other hand, radiation detectors having a large number of picture elements are quite expensive and require a high dose for a sufficient signal to noise ratio (SNR).

It is therefore desirable to improve the aforementioned conventional tomography apparatuses, so that a high optical resolution is achieved with low costs of the radiation detector.

This is achieved by an imaging apparatus and an imaging method according to the following.

SUMMARY

An example provides an imaging apparatus, particularly a tomography apparatus, for analysing an object comprising a radiation source for transmission of radiation through the object in a section plane of the object and further comprising a radiation detector for detecting the radiation in the section plane of the object after transmission through the object. Further, the imaging apparatus comprises a masking device for masking out a part of the radiation, wherein the masked part of the radiation is movable in the section plane relatively to the radiation detector during the analysis of the object. The Radon data are calculated from the differences of the detector output during the movement of the masked part of the radiation.

Therefore, it is not necessary to provide a multi-channel radiation detector having a large number of picture elements in order to achieve a high optical resolution. Instead, a high optical resolution is achieved by moving the masked part of the radiation relatively to the detector, so that the data generated by the radiation detector are representative of a specific angle as in the conventional radiation detectors having a large number of picture elements.

Hence, the optical resolution of the imaging apparatus is determined by the motion speed of the masked part of the radiation and the sampling rate of the measurements of the radiation detector. The lower the motion speed of the masked part of the radiation and the higher the time resolution of the radiation detector, the higher is the optical resolution, which can be achieved by the imaging apparatus. It is therefore advantageously possible to achieve an extremely high optical resolution with a low cost radiation detector.

BRIEF DESCRIPTION OF THE DRAWINGS

Various aspects of a number of embodiments of the invention will be better understood by reference to the following detailed description of one or more preferred, exemplary embodiments taken in consideration with the accompanying drawings.

DETAILED DESCRIPTION

In an exemplary embodiment of the invention, a masking device comprises a movable shutter being disposed in a path of the radiation between a radiation source and a radiation detector, so that the shutter is blocking, i.e. shielding, a part of the radiation depending on its position. In this embodiment, the shutter is an opto-mechanical component, which is intransparent with regard to the radiation and which can be moved relatively to the detector.

In a first variant of this embodiment the shutter is disposed between the radiation source and the object. However, it is alternatively possible to dispose the shutter between the object and the radiation detector, i.e. on the other side of the object.

Further, the shutter can be linearly or rotary movable. In case of a rotary shutter, the shutter is preferably cylindrical and surrounding the object or the radiation source, wherein the object is preferably disposed on the axis of rotation of the shutter.

Moreover, the shutter is preferably a single-edge shutter blocking the radiation in the section plane on one side only. However, it is theoretically possible to use a slot shutter having a slot, wherein the slot shutter is blocking the radiation on both sides of the slot.

Further, the imaging apparatus preferably comprises a drive for moving the shutter with a defined motion speed and a feedback controller for closed loop controlling of the motion speed of the shutter depending on the output of the radiation detector. If the output of the radiation detector indicates a detail within the object, the feedback controller preferably reduces the motion speed of the shutter, so that the optical resolution is increased at the position of the detail within the object. However, if the output of the radiation detector indicates a homogeneous part of the object, the feedback controller preferably increases the motion speed of the shutter, since a high optical resolution is not necessary in homogeneous parts of the object.

In another embodiment of the invention, the masking device does not comprise an opto-mechanical shutter. Instead, the masking device is making the radiation detector partially insensitive in order to mask out a corresponding part of the radiation. In this embodiment the masking device and the radiation detector can be integrated in a single component thereby reducing the complexity and the costs of the imaging apparatus according to the invention. For example, a multi-channel radiation detector might be used having several picture elements, which are selectively deactivated in order to mask out a part of the radiation in the region of the deactivated picture elements.

It has already been mentioned that the masked part of the radiation, i.e. the blocked or shielded part of the radiation, is movable relatively to the radiation detector. In one embodiment of the invention the radiation detector is fixedly arranged, whereas the masked part of the radiation is movable, e.g. by moving the aforementioned opto-mechanical shutter. In another embodiment of the invention, the masked part of the radiation is fixedly arranged, e.g. due to a stationary shutter, whereas the radiation detector is movable, e.g. by rotating the radiation detector around the object. However, it is also possible that both the radiation detector and the masked part of the radiation are being moved during the analysis of the object, e.g. by moving both the radiation detector and the shutter.

The radiation detector preferably comprises a single output channel, so that an inexpensive radiation detector can be used. However, it is alternatively possible to use a radiation detector having multiple (e.g. five) output channels, wherein the masking device is used to increase the optical resolution.

Further, it should be noted that the object itself is preferably rotating during the analysis. Therefore, the imaging apparatus preferably comprises a rotary carrier receiving the object, wherein the rotary carrier has an axis of rotation, which is aligned perpendicular to the section plane through the object. Further, the imaging apparatus preferably comprises a drive for rotating the carrier along with the object around the axis of rotation, whereas the radiation detector is preferably fixed. The object is preferably rotated in order to generate the aforementioned so-called Radon data.

However, it is alternatively possible to rotate the radiation detector. In other words, a relative movement is necessary.

Moreover, it should be noted that the radiation source is not necessarily an X-ray source as initially mentioned. Instead, the radiation source can be an ultrasonic source, a light source, particularly a laser, a Gamma radiation source, a neutron source, an electron source, a radiation source emitting electromagnetic waves, particularly microwaves, or a radiation source emitting ionising or non-ionising radiation. In other words, the imaging apparatus is not restricted to a specific type of radiation.

Further, the imaging apparatus preferably comprises an evaluation unit connected to the radiation detector for generating Radon data from the detected radiation, wherein the Radon data are representing properties of the object, so that a sectional view of the object can be generated by processing the Radon data. However, the evaluation unit is not necessarily part of the invention, so that the imaging apparatus can be realized as a separate system delivering imaging data to the evaluation unit, which is a separate system.

The further processing of the Radon data can be accomplished in a conventional way, which is disclosed for example in BUZUG: "Einführung in die Computertomographie", Springer-Verlag (2004). Therefore, the disclosure of the aforementioned reference book is incorporated by reference herein with regard to the generation and further processing of the Radon data.

It should further be noted that the invention is not restricted to the aforementioned imaging apparatus but also relates to a corresponding imaging method.

Further, the invention is not restricted to the use as a diagnostic tool in the field of medical science. Further, the imaging apparatus can also be used for analysing mechanical components of a machine, particularly of a spacecraft or an aircraft.

Figure 1A:
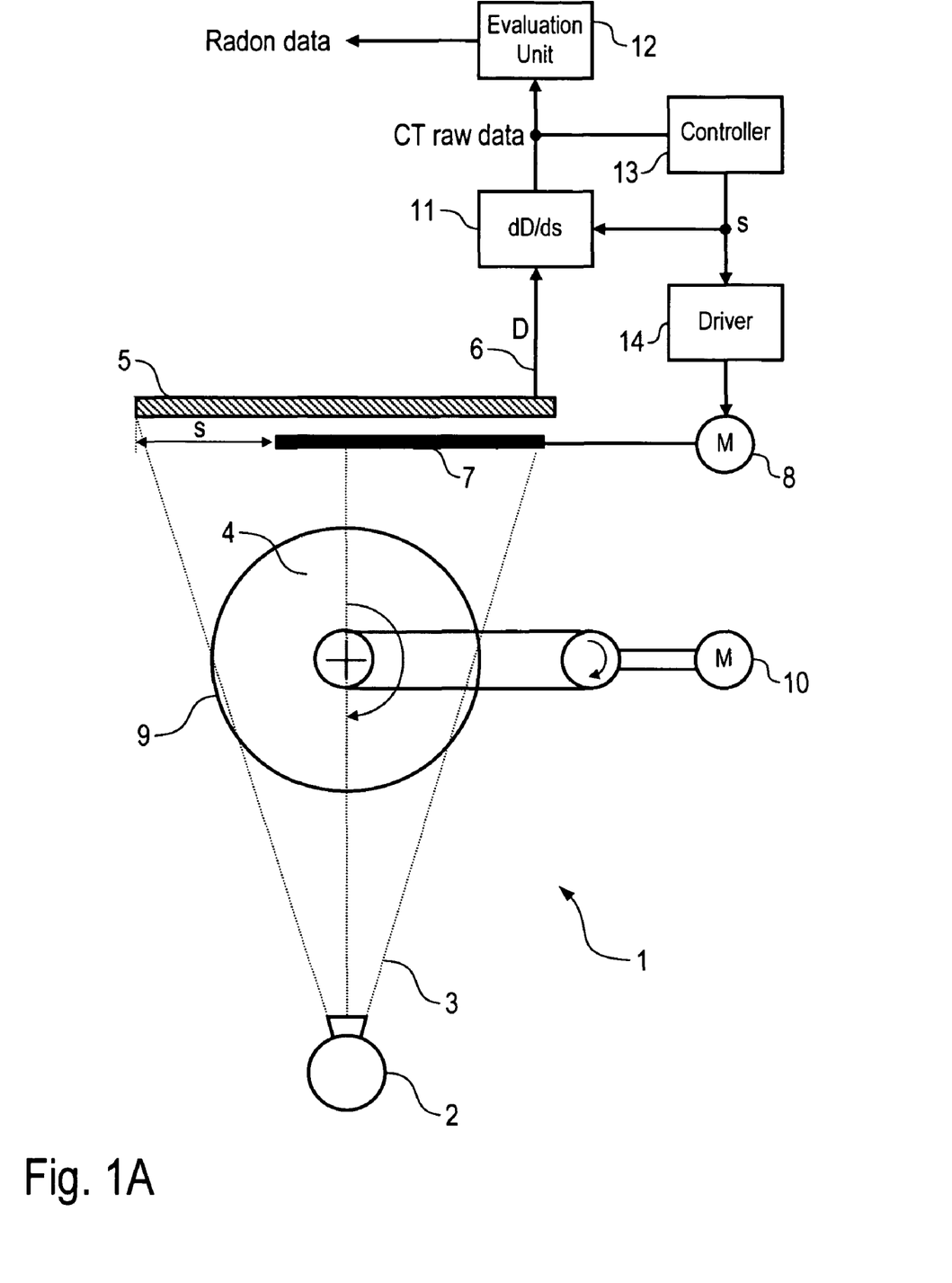
FIGS. 1A and 1b are schematic views of an exemplary tomography apparatus according to the invention, in which an opto-mechanical shutter is linearly movably disposed between an object and a radiation detector, wherein the shutter is shown in different positions.
Figure 1B:
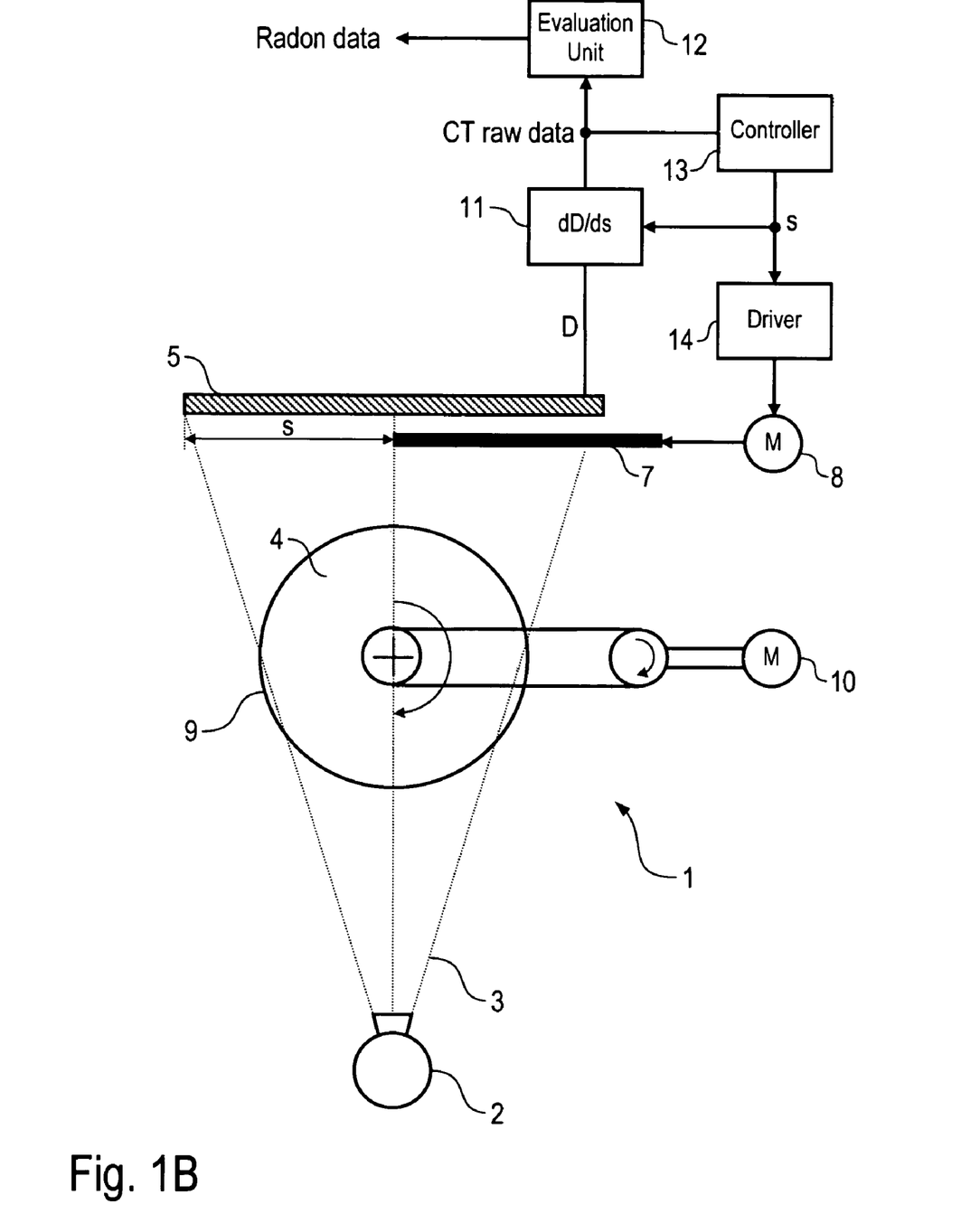

FIGS. 1A and 1B schematically show a presently preferred embodiment of a tomography apparatus 1 according to the invention.

The tomography apparatus 1 comprises a radiation source 2 emitting radiation 3 in a section plane in the direction of an object 4, e.g. a human body, wherein the section plane is identical with the plane of the drawing.

However, the invention is not restricted to the analysis of the human body. Instead, other types of objects can be analysed, e.g. mechanical parts of machines, particularly of aircrafts or spacecrafts.

In this embodiment the radiation source 2 is an X-ray source. However, other types of radiation sources can be used within the framework of the invention.

Further, the tomography apparatus 1 comprises a radiation detector 5, which is disposed in the path of the radiation 3 behind the object 4, so that the radiation detector 5 detects the radiation 3 after transmission through the object 4. Further, it should be noted that the radiation detector 5 comprises a single output channel 6 only, so that the radiation detector 5 is quite inexpensive compared with multi-channel radiation detectors as used in conventional tomography apparatuses.

Further, the tomography apparatus 1 comprises an opto-mechanical shutter 7, which is disposed in the path of the radiation 3 between the object 4 and the radiation detector 5. The shutter 7 is linearly movable by a motor 8, so that the shutter 7 is masking out a part of the radiation 3 depending on the position s of the shutter 7 relative to the radiation detector 5.

It should further be noted that the object 4 is disposed on a rotary carrier 9, which is rotatable around an axis of rotation, which is aligned perpendicular to the section plane of the object 4, i.e. the plane of the drawing. Further, the tomography apparatus 1 comprises a motor 10, which is rotating the rotary carrier 9 along with the object 4 during the analysis of the object.

The radiation detector 5 detects an intensity D of a part the radiation 3, which is transmitted through the object 4 and not blocked by the opto-mechanical shutter 7. Therefore, the intensity D of the detected radiation 3 depends both on the position s of the shutter 7 and the properties of the object 4, i.e. the attenuation of the radiation 3 by the object 4.

Figure 2:
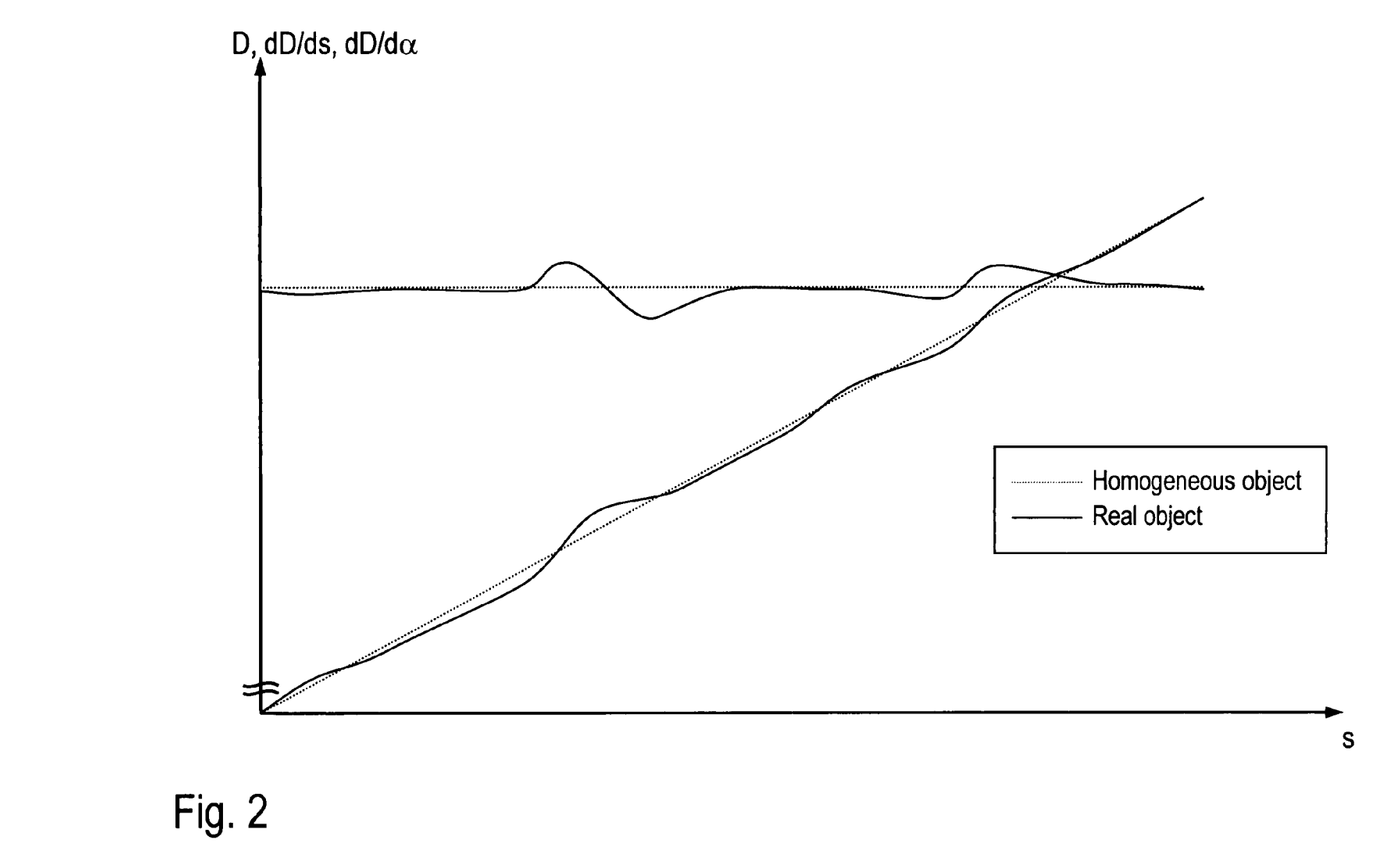
FIG. 2 is a diagram showing the output of the radiation detector depending on the position of the opto-mechanical shutter.

In case of in idealised fully homogeneous object 4, the intensity D is approximately linearly dependent on the position s of the opto-mechanical shutter 7 as shown by the dashed line in FIG. 2.

However, if the object 4 is inhomogeneous, as in the case of a human body, the intensity D is not only dependent on the position s of the opto-mechanical shutter 7, but also depends on optical properties of the object 4. Therefore, the inclination of the curve as shown in FIG. 2 depends on local variations of the optical properties of the object 4.

Therefore, the single output channel 6 of the radiation detector 5 is connected to a differentiator 11, which calculates the derivative dD/ds of the intensity D with regard to the position s of the shutter 7, since this derivative is indicative of the optical properties of the object 4.

Further, the differentiator 11 is connected to an evaluation unit 12, which generates conventional Radon data for further processing as known in the state of the art.

Moreover, the differentiator 11 is connected to a controller 13, which actuates a driver 14. The driver 14 in turn actuates the motor 8, which moves the shutter 7. Therefore, the controller 13 controls the motion speed ds/dt of the opto-mechanical shutter 7 depending on the derivative dD/ds, so that the motion speed of the shutter 7 is closed loop controlled by the controller 13.

If the output of the radiation detector 5 indicates a detail within the object 4, the feedback controller 13 preferably reduces the motion speed ds/dt of the shutter 7, so that the optical resolution is increased at the position of the detail within the object 4.

However, if the output of the radiation detector 5 indicates a homogeneous part of the object 4, the feedback controller 13 preferably increases the motion speed ds/dt of the shutter 7, since a high optical resolution is not necessary in homogeneous parts of the object 4.

The afore-mentioned tomography apparatus 1 allows several modes of operation, which will be explained in the following.

In a first mode of operation, the shutter 7 is moved discontinuously, i.e. step-by-step, and the radiation detector 5 is resetted after each step.

In a second mode of operation, the shutter 7 is moved continuously and the radiation detector is resetted periodically.

In a third mode of operation, the radiation detector 5 is not resetted during the analysis of the object 4. Further, the shutter 7 can be moved either discontinuously, i.e. step-by-step, or continuously. However, in this mode of operation the differentiator 11 must differentiate the measured intensity D with regard to time t and with regard to the position s of the shutter 7.

Figure 3A:
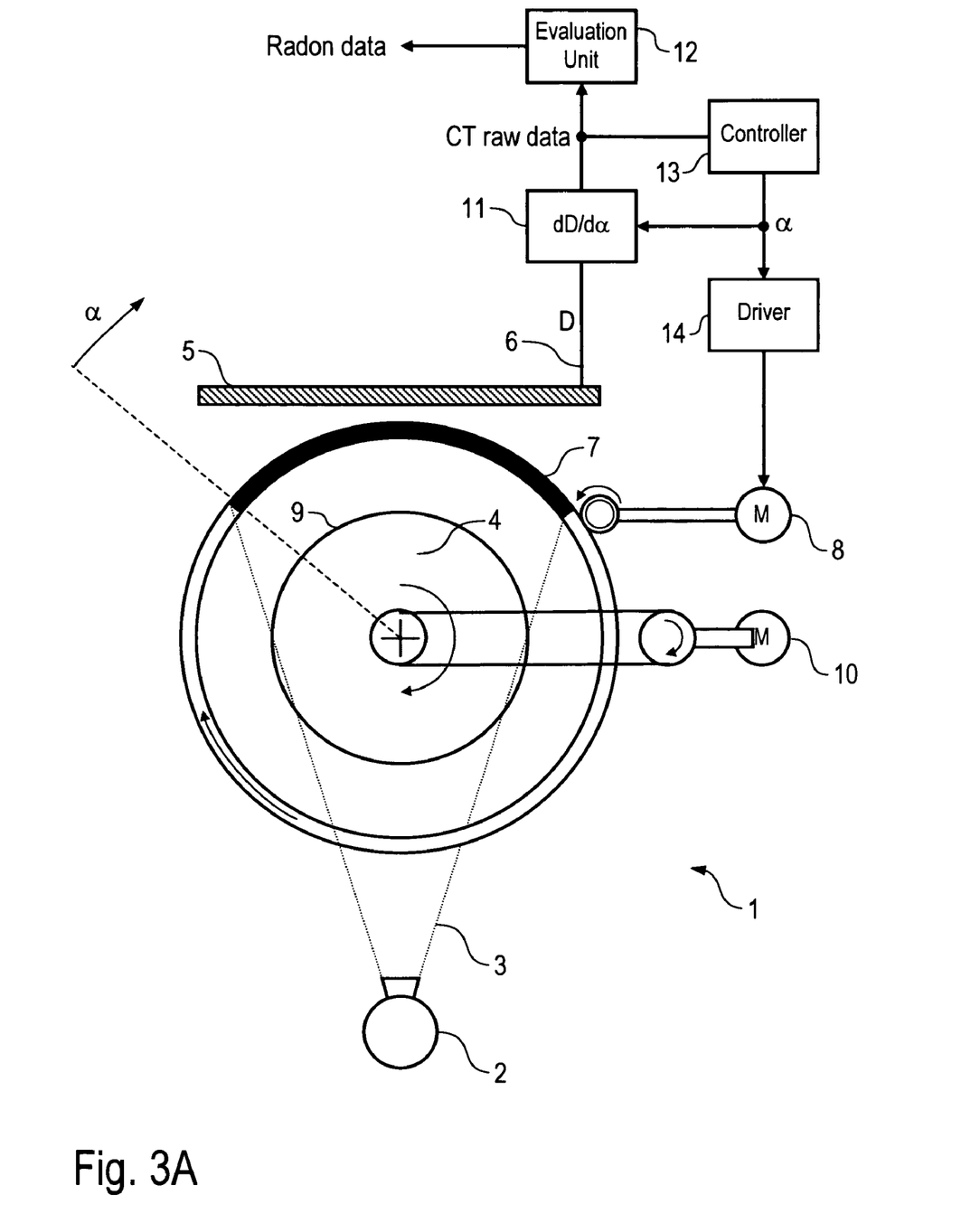
FIGS. 3A and 3B are schematic views of an alternative embodiment of a tomography apparatus according to the invention comprising a rotary shutter in different positions.
Figure 3B:
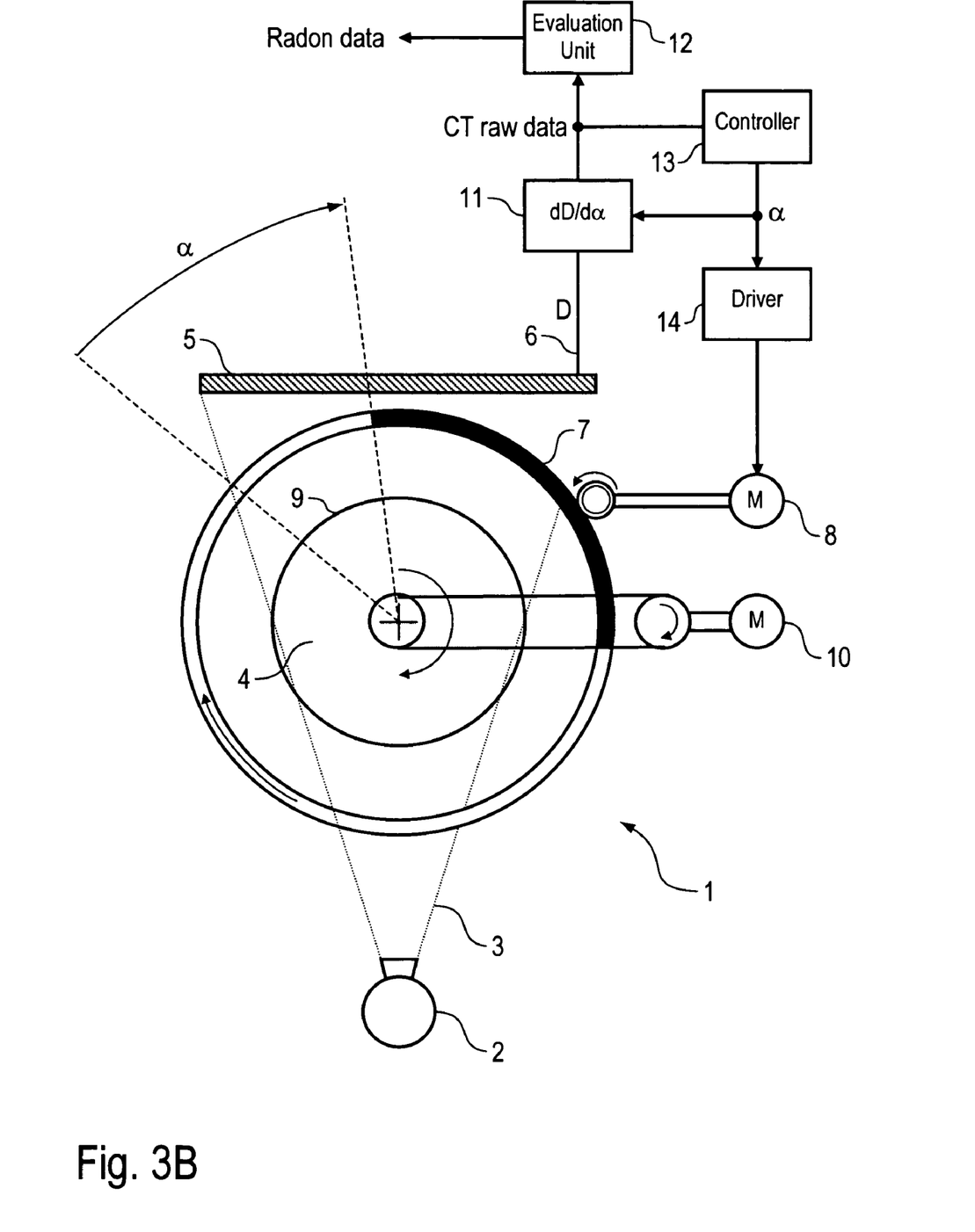

FIGS. 3A and 3B schematically show a similar tomography apparatus 1, which partially corresponds to the tomography apparatus 1 as shown in FIGS. 1A and 1B. Therefore, it is referred to the above description in order to avoid unnecessary repetitions. Further, the same reference numerals are used in the following description relating to the embodiment according to FIGS. 3A and 3B.

One major difference of this embodiment is that the shutter 7 is rotary movable and approximately pot-shaped. Therefore, the shutter 7 is partially blocking the radiation 3 depending on its angularity α.

Figure 4A:
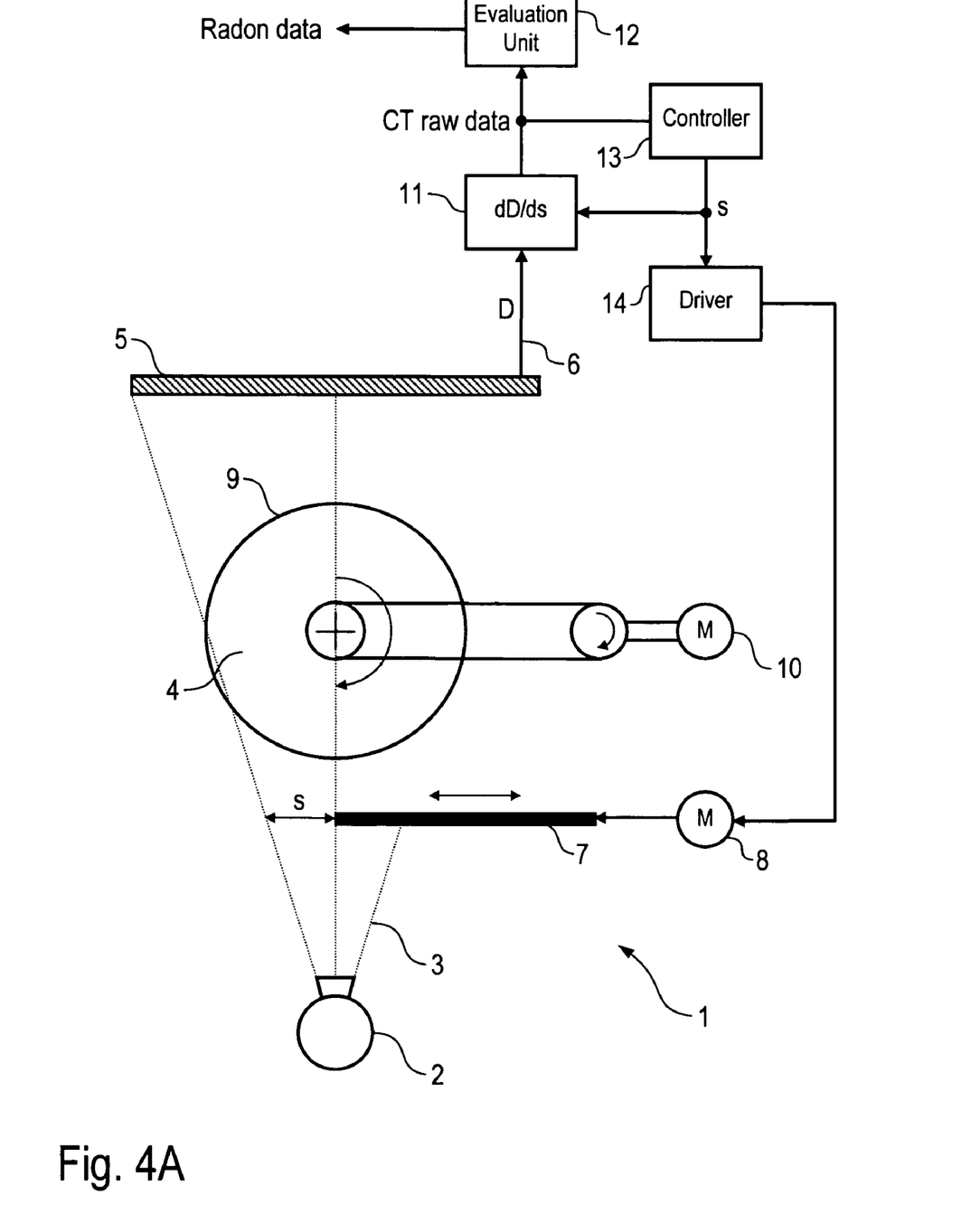
FIGS. 4A and 4B are schematic views of an alternative embodiment of a tomography apparatus according to the invention in which the opto-mechanical shutter is also linearly movable, but disposed between the object and the radiation source.
Figure 4B:
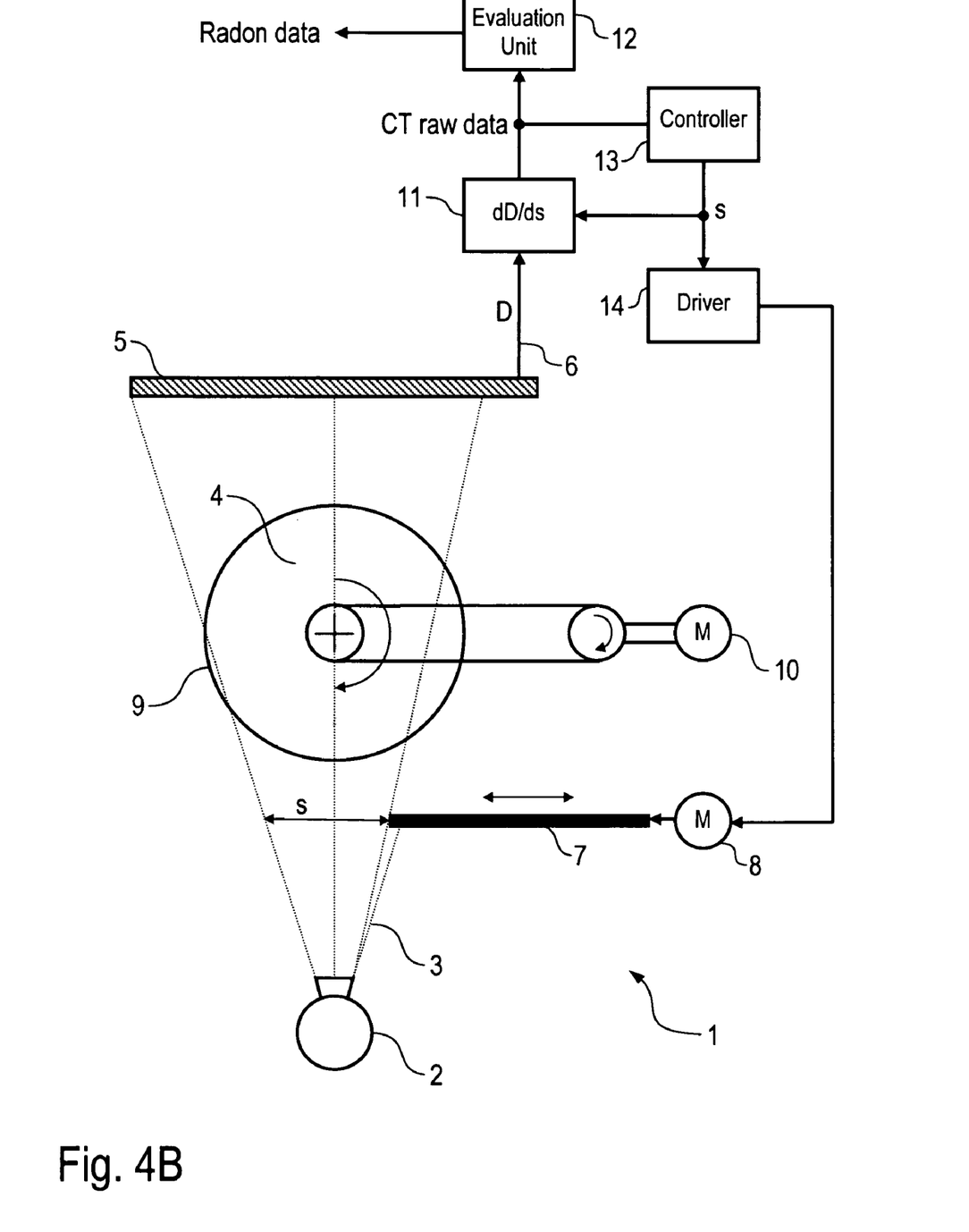

FIGS. 4A and 4B schematically show another embodiment of a tomography apparatus 1 according to the invention, which is similar to the embodiment shown in FIGS. 1A and 1B. Therefore, reference is made to the above description in order to avoid unnecessary repetitions. Further, the same reference numerals are used in the following description.

One major difference of this embodiment is that the shutter 7 is disposed in the path of the radiation 3 between the radiations source 2 and the object 4.

Figure 5:
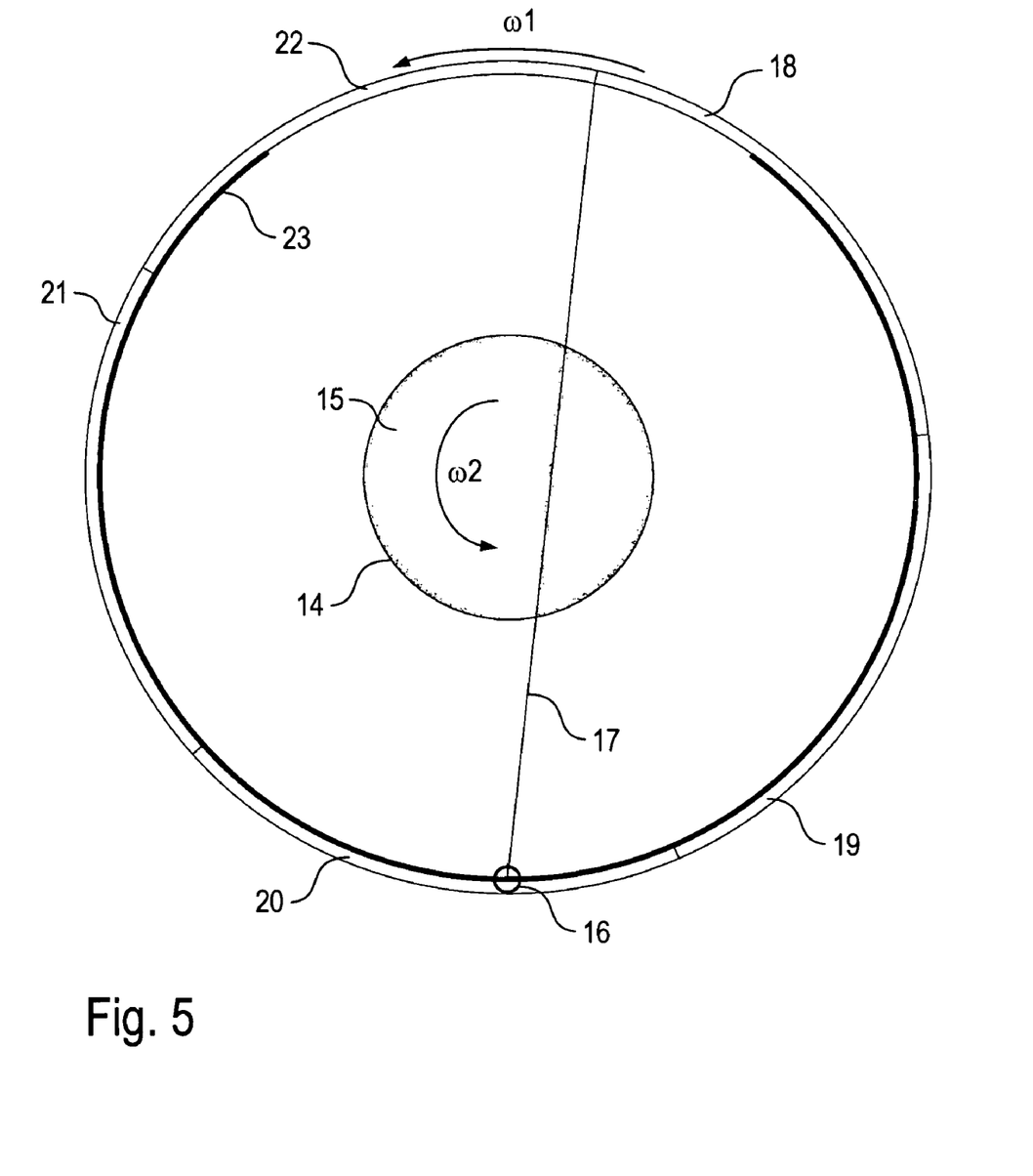
FIG. 5 is a simplified schematic view of another embodiment of a tomography apparatus according to the invention comprising a stationary shutter and a multi channel radiation detector.

Finally, FIG. 5 schematically shows another embodiment of the invention.

This embodiment also comprises a rotary carrier 14 receiving in object 15, e.g. a human body, which is to be analysed. The rotary carrier 14 along with the object 15 is rotated around an axis of rotation being aligned perpendicular to the plane of the drawing.

Further, the tomography apparatus comprises a radiation source 16 emitting radiation 17 in the direction of the object 15 so that the radiation 17 is transmitted through and attenuated by the object 15.

Moreover, in this embodiment the tomography apparatus comprises a pot-shaped radiation detector consisting of five separate radiation detectors 18-22 surrounding the object 15. The radiation detectors 18-22 are rotating around the same axis of rotation as the rotary carrier 14 and in the same direction. However, the radiation detectors 18-22 are rotating with a rotational speed $\omega 1$, whereas the rotary carrier 14 is rotating with a rotational speed $\omega 2 = 0.5 \omega 1$.

Further, the inner circumferential surface of the pot-shaped detectors 18-22 is partially shielded by a stationary shutter 23.

While one or more specific preferred embodiments have been described herein, those skilled in the art will readily recognize modifications, variations and examples that do not depart from the spirit and scope of the subject invention, as herein claimed.

The invention claimed is:

1. An imaging apparatus for analyzing an object, comprising:
   a) a radiation source for transmission of radiation through an object in a section plane of said object;
   b) a radiation detector for detecting said radiation in said section plane of said object after transmission through said object, wherein said radiation detector comprises a detection range extending in said section plane;
   c) a masking device for masking out a part of said radiation, wherein said masked part of said radiation is movable in said section plane and parallel to said section plane relative to said radiation detector during said analysis of said object; and
   d) an evaluation unit connected to the radiation detector for generating Radon data from said detected radiation, said Radon data representing properties of said object, wherein said evaluation unit calculates said Radon data from the differences of the output of said radiation detector during the movement of said masked part of said radiation.

2. An imaging apparatus according to claim 1, wherein said masking device comprises a movable shutter being disposed in the path of said radiation between said radiation source and said radiation detector, said shutter blocking a part of said radiation depending on its position.

3. An imaging apparatus according to claim 2, wherein said shutter is disposed between said radiation source and said object.

4. An imaging apparatus according to claim 2, wherein said shutter is disposed between said object and said radiation detector.

5. An imaging apparatus according to claim 2, wherein said shutter is linearly movable.

6. An imaging apparatus according to claim 2, wherein said shutter is rotary movable.

7. An imaging apparatus according to claim 2, wherein said shutter is a single-edge shutter blocking said radiation in said section plane on one side only.

8. An imaging apparatus according to claim 2, further comprising:
 a) a drive for moving said shutter with a defined motion speed; and
 b) a feedback controller for closed loop controlling of said motion speed of said shutter depending on the output of said radiation detector.

9. An imaging apparatus according to claim 1, wherein said masking device makes said radiation detector partially insensitive to mask out said part of said radiation.

10. An imaging apparatus according to claim 1, wherein said radiation detector is fixedly arranged, whereas said masked part of said radiation is movable.

11. An imaging apparatus according to claim 1, wherein said masked part of said radiation is fixedly arranged, whereas said radiation detector is movable.

12. An imaging apparatus according to claim 1, wherein said radiation detector comprises a single output channel.

13. An imaging apparatus according to claim 1, wherein said radiation detector comprises multiple output channels.

14. An imaging apparatus according to claim 1, wherein said radiation detector and said masking device are integrated in a single component.

15. An imaging apparatus according to claim 1, further comprising:
 a) rotary carrier receiving said object, said rotary carrier having an axis of rotation perpendicular to said section plane; and
 b) a drive for rotating said rotary carrier along with said object, whereas said radiation detector is fixed.

16. An imaging apparatus according to claim 1, wherein said radiation source is selected from a group consisting of:
 a) an X-ray source;
 b) an ultrasonic source;
 c) a light source;
 d) a Gamma radiation source;
 e) a neutron source;
 f) an electron source;
 g) a radiation source emitting electro-magnetic waves;
 h) a radiation source emitting ionising radiation; and
 i) a radiation source emitting non-ionising radiation.

17. An imaging apparatus according to claim 16, wherein the light source comprises a laser.

18. An imaging apparatus according to claim 16, wherein the electro-magnetic waves comprise microwaves.

19. An imaging apparatus according to claim 1, wherein the imaging apparatus is a tomography apparatus.

20. An imaging method for analysing an object, comprising:
 a) transmitting radiation through an object in a section plane of said object;
 b) detecting said radiation after transmission through said object in said section plane, wherein said radiation is detected within a detection range extending in said section plane;
 c) masking out a part of said radiation, whereas said masked part of said radiation is moved parallel to said section plane relative to the path of said radiation during said analysis of said object; and
 d) generating Radon data from said detected radiation, said Radon data representing properties of said object, wherein said Radon data are calculated from the differences of said detected radiation during the movement of said masked part of said radiation.

21. An imaging method according to claim 20, further comprising:
 moving a shutter in said path of said radiation between a radiation source and a radiation detector for masking said radiation, wherein said shutter forms a masking device.

22. An imaging method according to claim 21, wherein said shutter is moved between said object and said radiation detector.

23. An imaging method according to claim 21, wherein said shutter is linearly moved.

24. An imaging method according to claim 21, wherein said shutter is rotated.

25. An imaging method according to claim 21 wherein said shutter is continuously moved.

26. An imaging method according to claim 21, wherein said shutter is discontinuously moved.

27. An imaging method according to claim 21, wherein said masking device makes said radiation detector partially insensitive for masking said part of said radiation.

28. An imaging method according to claim 21, wherein said radiation detector is fixedly arranged, whereas said masked part of said radiation is moved.

29. An imaging method according to claim 21, wherein said masked part of said radiation is fixedly arranged, whereas said radiation detector is moved.

30. An imaging method according to claim 21, wherein said shutter is moved between said radiation source and said object.

31. An imaging method according to claim 20, further comprising:
 a) moving said masked part of said radiation with a defined motion speed in said section plane of said object; and
 b) closed loop controlling of said motion speed of said masked part of said radiation depending on said detected radiation.

32. An imaging method according to claim 20, wherein said object is rotated around an axis of rotation perpendicular to said section plane of said object.

33. An imaging method according to claim 20, wherein said object is selected from the group consisting of:
 a) an animal;
 b) a body part of an animal;
 c) a body part of a human being;
 d) a component of a machine;
 e) a component of a spacecraft;
 f) a component of an aircraft; and
 g) a component of a motor vehicle.

34. An imaging method according to claim 20, wherein said radiation is selected from the group consisting of:
 a) x-ray radiation;
 b) ultrasonic radiation;
 c) light radiation;
 d) Gamma radiation;
 e) neutron radiation;
 f) electron radiation;
 g) electro-magnetic radiation;
 h) ionising radiation; and
 i) non-ionising radiation.

35. An imaging method according to claim 34, wherein said light radiation comprises laser radiation.

36. An imaging method according to claim 34, wherein said electro-magnetic radiation comprises microwave radiation.

37. An imaging method according to claim 20, wherein the imaging method is a tomography method.

* * * * *

UNITED STATES PATENT AND TRADEMARK OFFICE
CERTIFICATE OF CORRECTION

PATENT NO. : 7,835,487 B2
APPLICATION NO. : 12/306347
DATED : November 23, 2010
INVENTOR(S) : Tischenko et al.

Page 1 of 1

It is certified that error appears in the above-identified patent and that said Letters Patent is hereby corrected as shown below:

On the Title Page

Item (73) Assignee, please change the Assignee from "Helmholtz Zentrum Mü Deutsches Forscshungszentrum fur Gesundheit and Umwelt (GmbH) (DE)" to --Helmholtz Zentrum München Deutsches Forschungszentrum für Gesundheit und Umwelt (GmbH) (DE)--.

Signed and Sealed this
Eighteenth Day of January, 2011

David J. Kappos
*Director of the United States Patent and Trademark Office*